United States Patent
Park et al.

(10) Patent No.: US 9,036,011 B2
(45) Date of Patent: May 19, 2015

(54) OPTICAL PHASE EXTRACTION SYSTEM HAVING PHASE COMPENSATION FUNCTION OF CLOSED LOOP TYPE AND THREE-DIMENSIONAL IMAGE EXTRACTION METHOD THEREOF

(75) Inventors: Hyoung Jun Park, Gwangju (KR); Hyun Seo Kang, Gwangju (KR); Young Sun Kim, Daejeon (KR); Kwon-Seob Lim, Gwangju (KR); In Hee Shin, Gwangju (KR); Young Soon Heo, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 347 days.

(21) Appl. No.: 13/524,156

(22) Filed: Jun. 15, 2012

(65) Prior Publication Data

US 2013/0033573 A1   Feb. 7, 2013

(30) Foreign Application Priority Data

Aug. 4, 2011   (KR) ........................ 10-2011-0077739

(51) Int. Cl.
| | |
|---|---|
| H04N 13/02 | (2006.01) |
| H04N 5/225 | (2006.01) |
| H04N 5/335 | (2011.01) |
| H04N 3/14 | (2006.01) |
| G01B 9/02 | (2006.01) |

(Continued)

(52) U.S. Cl.
CPC ............ *G01B 9/0201* (2013.01); *G01B 9/0207* (2013.01); *G01B 11/2441* (2013.01); *G01B 9/02067* (2013.01); *G01B 9/02095* (2013.01); *G01H 9/00* (2013.01)

(58) Field of Classification Search
None
See application file for complete search history.

(56) References Cited

U.S. PATENT DOCUMENTS

| 5,048,964 A | 9/1991 | Tyrer et al. |
| 6,043,870 A | 3/2000 | Chen |

(Continued)

OTHER PUBLICATIONS

Creath, Katherine, "Phase-shifting speckle interferometry," Applied Optics, vol. 24(18):3053-3058 (1985).

(Continued)

*Primary Examiner* — Dave Czekaj
*Assistant Examiner* — Nam Pham
(74) *Attorney, Agent, or Firm* — Nelson Mullins Riley & Scarborough LLP; Anthony A. Laurentano, Esq.; Lewis Lee, Esq.

(57) ABSTRACT

Provided is an image extraction method of optical phase extraction system. The image extraction method may include checking whether a phase error due to an environmental disturbance of optical fiber occurs by monitoring an output signal obtained by interfering reflection optical signals reflected through two paths. When a phase error occurs, an error is compensated using a phase compensation control method of closed loop type through one of the two paths and an image is extracted by capturing an image of object in a state that the image of object is shifted by the set phase value when a phase error is compensated. According to the inventive concept, a phase error occurring in an optical fiber type interferometer due to an environmental disturbance is minimized or compensated. Also, since an interference image accurately shifted by the phase value set among arbitrary various phase values is obtained through a camera, reliability of three-dimensional phase information being extracted is guaranteed.

8 Claims, 5 Drawing Sheets

(51) Int. Cl.
*G01B 11/24* (2006.01)
*G01H 9/00* (2006.01)

(56) References Cited

U.S. PATENT DOCUMENTS 6,362,873 B1 3/2002 Facchini et al.
8,477,318 B2 * 7/2013 Dillon et al. .................. 356/511

OTHER PUBLICATIONS

Hariharan, P., "Digital phase-stepping interferometry: effects of multiply reflected beams," Applied Optics, vol. 26 (13):2506-2507 (1987).

Martini, Giuseppe et al., "Automatic Phase Stepping in Fiber-Optic ESPI by Closed-Loop Gain Switching," IEEE Transactions on Instrumentation and Measurement, vol. 49(4):823-828 (2000).

Park, Hyoung-Jun et al., "A Quarter-Wave Phase-Stepping Algorithm for Fiber-Optic Electronic Speckle Pattern Interferometry Using Zero-Crossing Triggers," IEEE Photonics Technology Letters, vol. 18(16):1732-1734 (2006).

Robinson, D.W. et al., "Digital Phase Stepping Speckle Interferometry," Optics Communications, vol. 57(1):26-30 (1986).

Valera, J.D. et al., "Determination of Vibration Phase with Electronic Speckle Pattern Interferometry (ESPI)," Electronics Letters, vol. 28(25):2292-2294 (1992).

* cited by examiner

OPTICAL PHASE EXTRACTION SYSTEM HAVING PHASE COMPENSATION FUNCTION OF CLOSED LOOP TYPE AND THREE-DIMENSIONAL IMAGE EXTRACTION METHOD THEREOF

CROSS-REFERENCE TO RELATED APPLICATIONS

This U.S. non-provisional patent application claims priority under 35 U.S.C. §119 of Korean Patent Application No. 10-2011-0077739, filed on Aug. 4, 2011, the entire contents of which are hereby incorporated by reference.

BACKGROUND

The present inventive concept herein relates to an image extraction, and more particularly, to an optical phase extraction system forming an interferometer using an optical fiber and a three-dimensional image extraction method thereof.

To measure very little displacement or vibration in real time in a wide area with respect to a measuring object, a laser interference method having a high spatial decomposition rate is often used.

A three-dimensional shape information measurement method using a laser interference method may be divided into an electronic speckle pattern interferomety (ESPI) and a searography according to a measuring object and a measuring environment. Also, the laser interferometer is divided into an optical fiber type and a bulk type according to the type of optical device being used.

The bulk type interferometer has disadvantages of large volume and great optical loss while in the optical fiber type interferometer, an optical arrangement can be easily performed and optical elements applied thereto are small and light. Thus, the optical fiber type interferometer has advantages that its portability is good and it can be easily made.

An EPI system having an optical fiber type interferometer is disclosed in a U.S. Pat. No. 6,043,870. To extract three-dimensional shape information of measuring object, a process of operating CCD images obtained at the state that the measuring object is phase-shifted is needed. Thus, the ESPI system adopts a phase modulator. A technique improving contrast of images using a pulse image supplementary ESPI technique without the use of phase modulator is disclosed in U.S. Pat. No. 6,362,873.

Since most of phase modulators used in a phase shift of interferometer to acquire an image have a nonlinear operation characteristic, an arrangement of optical system becomes in disorder whenever it is measured. Thus, a phase compensation measure is needed to remove or minimize generated phase measuring errors.

In case of the optical fiber type interferometer, the change of optical output of interferometer is great because it is sensitive to an environment, that is, disturbance including, for example, temperature, humidity, vibration or strain. Thus, that is becoming one of the obstacles to commercialization of system because of the difficult of field application.

SUMMARY

Embodiments of the inventive concept provide an image extraction method of optical phase extraction system. The image extraction method may include checking whether a phase error due to an environmental disturbance of optical fiber occurs by monitoring an output signal obtained by interfering reflection optical signals reflected through two paths; compensating an error using a phase compensation control method of closed loop type through one of the two paths when a phase error occurs; and extracting an image by capturing an image of object in a state that the image of object is shifted by the set phase value when a phase error is compensated.

Embodiments of the inventive concept also provide a three-dimensional image extraction method of optical phase extraction system. The three-dimensional image extraction method may include preparing a first optical path receiving a modulated optical signal to provide it to an object through a lens and a second optical path which is installed around an optical coupler and has a closed loop type control structure; interfering reflection optical signals reflected through the first and second optical paths to provide the reflection optical signals to a light-receiving part; checking whether a phase error due to an environmental disturbance of optical fiber occurs or not by monitoring a lock-in amplification signal obtained using an output signal output from the light-receiving part and a synchronous signal output from a function generator; compensating the error by phase-shifting a reflection optical signal reflected from the second optical path by a phase error difference when a phase error occurs; and extracting a three-dimensional image by capturing an image of object from the set number of relative phases through the optical coupler when a phase error does not exist or is compensated.

Embodiments of the inventive concept also provide a three-dimensional image extraction method of optical phase extraction system. The three-dimensional image extraction method may include interfering reflection optical signals reflected from a first partial reflection coating part of first optical fiber and a second partial reflection coating part of second optical fiber through a coupler to provide the interfered reflection optical signals to a photo diode; checking whether a phase error due to an environmental change of optical fiber occurs by monitoring an output signal output from the photo diode and a lock-in amplification signal obtained using a synchronous signal output from a function generator; compensating an error using a phase compensation control method of closed loop type to phase-shift a reflection optical signal reflected from the second partial reflection coating part by a phase error difference when a phase error occurs; and capturing an image of object from the set number of relative phases to extract a three-dimensional image when a phase error is compensated or a phase error does not exist.

Embodiments of the inventive concept also provide an optical phase extraction system. The optical phase extraction system may include an optical fiber interferometer comprising a first optical path part and a second optical path part which branches off from a light source through a coupler; and a compensation processing extraction part forming a closed loop control structure with respect to the second optical path part, monitoring an output signal obtained by interfering reflection optical signals reflected through the first and second optical path parts to compensate the output signal through the second optical path part when a phase error due to an environmental change of optical fiber exists, and capturing an image of object in a state that it is phase-shifted by a set phase to restore the image when a phase error does not exist or is compensated.

Embodiments of the inventive concept also provide an ESPI system. The ESPI system may include a PID controller. The ESPI system is configured to monitor an output signal obtained by interfering optical signals reflected at a specific reflectance ratio at ends of at least two optical paths, form a closed loop phase compensation path controlling one optical path of the two optical paths to compensate a phase error caused by an optical fiber disturbance and to generate a synchronous signal used when monitoring the output signal as adaptive trigger signal to obtain a CCD camera image.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Figure 1:
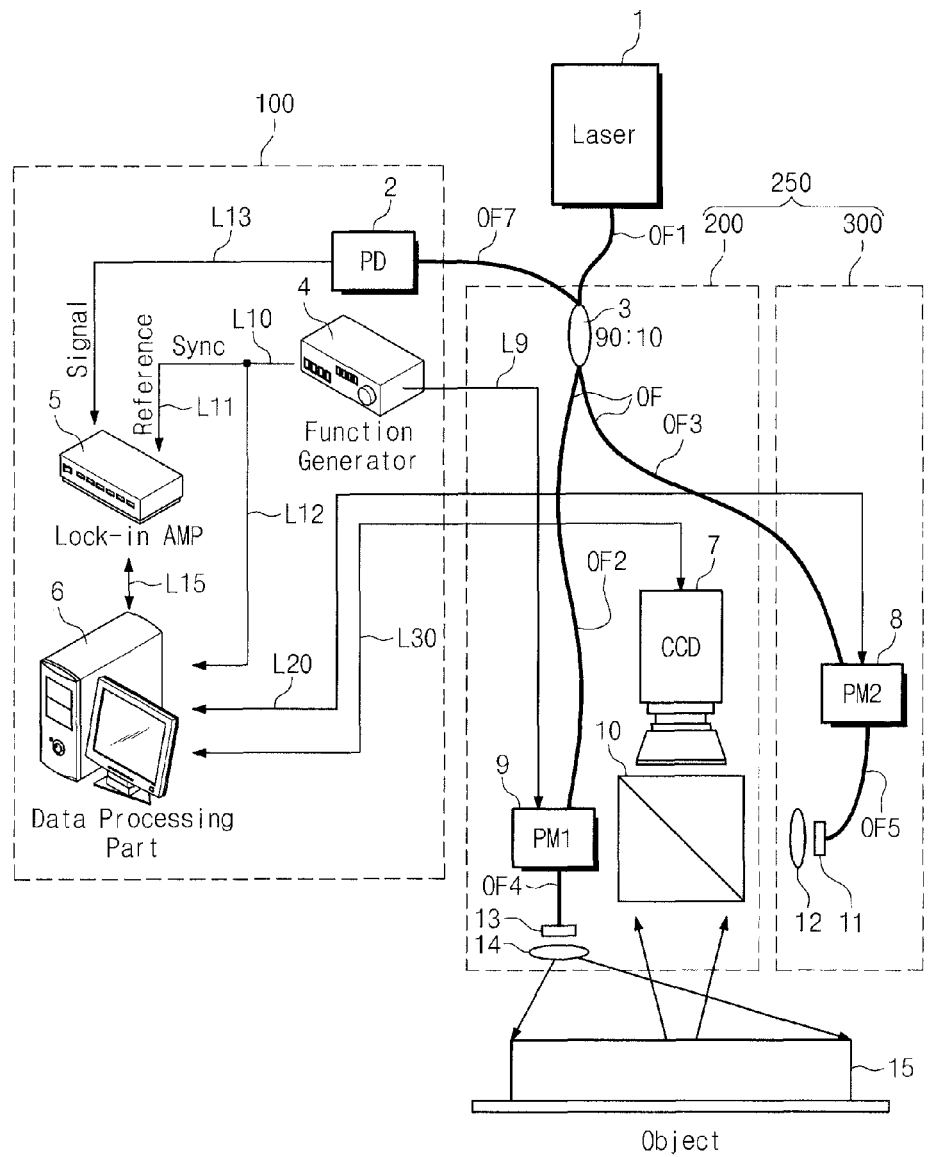
FIG. 1 is a block diagram of optical phase extraction system in accordance with some embodiments of the inventive concept.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present.

FIG. 1 is a block diagram of optical phase extraction system in accordance with some embodiments of the inventive concept.

The optical phase extraction system includes an optical fiber type interferometer 250 including a first optical path part 200 and a second optical path part 300 which branch off a light source 1 through a coupler 3. Thus, the optical fiber type interferometer 250 includes the laser light source 1, the coupler 3, a CCD camera 7, a first phase modulator 9, a second phase modulator 8, an optical coupler 10, first and second partial reflection coating parts 13 and 11 and first and second lenses 14 and 12.

The optical phase extraction system includes a compensation processing extraction part 100. The compensation processing extraction part 100 forms a closed loop control structure, monitors an output signal obtained by interfering reflection optical signals reflected through the first and second optical path parts to compensate the output signal through the second optical path part 300 when phase errors exist due to the environmental change of optical fiber and captures an image of object in a state that it is phase-shifted by a set phase to restore the image when a phase error does not exist or is compensated. Thus, the compensation processing extraction part 100 includes a photodiode 2 as a light-receiving part, a function generator 4, a lock-in amplifier 5 and a data processing part 6.

First, an extraction of modified phase is needed to obtain three-dimensional shape information of 15 of measuring object 15 from an interference pattern obtained from the CCD camera 7. A distribution function of surface roughness degree (surface height) of the measuring object 15 may be represented as follows.

$$h(x, y) = \frac{\lambda}{4\pi} \phi(x, y)$$

To obtain shape information of object, phase ($\phi$(x, y)) information should be extracted.

A phase shift method is mainly used to extract a phase from interference pattern. A phase difference may be obtained by giving a phase change between two interference lights forming an interference pattern to compare an initial interference pattern with a changed interference pattern.

An output of each pixel obtained from an interference pattern of the optical interferometer by CCD camera is defined from an interference theory as follows.

$$I_i = I_0(x,y) \pm V\cos(\phi(x,y)+\delta_0+\phi_i)$$

Herein, $I_0$ (x, y) is a DC component of interference output, $\phi$(x, y) is surface phase information of measuring object, $\delta_0$ is a modulation phase using a phase modulator and $\phi_i$ is the amount of phase changes due to an environmental disturbance. There are 3, 4 and 5 frame algorithms as a method of obtaining surface phase information of measuring object according to the number of images obtained by a CCD camera.

In case of 3 frame algorithm, an image output of measuring object has a phase shift of $2\pi/3$ and three interference patterns are obtained as follows.

$$I_1(x, y) = I_0(x, y) \pm V\cos\left(\phi(x, y) - \frac{2\pi}{3}\right)$$

$$I_2(x, y) = I_0(x, y) \pm V\cos(\phi(x, y))$$

$$I_3(x, y) = I_0(x, y) \pm V\cos\left(\phi(x, y) + \frac{2\pi}{3}\right)_K$$

The surface phase information of measuring object can be obtained from the above formula as follows.

$$\phi(x, y) = \tan^{-1}\left(\sqrt{3} \frac{I_1(x, y) - I_3(x, y)}{2I_2(x, y) - I_1(x, y) - I_3(x, y)}\right)$$

In case of 4 frame algorithm, the 4 frame algorithm has a phase shift of $\pi/2$ and four interference patterns are obtained as follows.

$$I_1(x, y) = I_0(x, y) \pm V\cos(\phi(x, y))$$

$$I_2(x, y) = I_0(x, y) \pm V\cos\left(\phi(x, y) + \frac{\pi}{2}\right) = I_0(x, y) \mp V\sin(\phi(x, y))$$

$$I_3(x, y) = I_0(x, y) \pm V\cos(\phi(x, y) + \pi) = I_0(x, y) \mp V\cos(\phi(x, y))$$

$$I_4(x, y) = I_0(x, y) \pm V\cos\left(\phi(x, y) + \frac{3\pi}{2}\right) = I_0(x, y) \pm V\sin(\phi(x, y))$$

From the above formula, surface phase information of measuring object can be obtained as follows.

$$\phi(x, y) = \tan^{-1}\left(\frac{I_4(x, y) - I_2(x, y)}{I_1(x, y) - I_3(x, y)}\right)$$

In case of 5 frame algorithm, the 5 frame algorithm has an arbitrary phase shift and five interference patterns are obtained as follows.

$$I_1(x,y) = I_0(x,y) \pm V\cos(\phi(x,y) - 2\alpha)$$

$$I_2(x,y) = I_0(x,y) \pm V\cos(\phi(x,y) - \alpha)$$

$$I_3(x,y) = I_0(x,y) \pm V\cos(\phi(x,y))$$

$$I_4(x,y) = I_0(x,y) \pm V\cos(\phi(x,y) + \alpha)$$

$$I_5(x,y) = I_0(x,y) \pm V\cos(\phi(x,y) + 2\alpha)$$

Surface phase information of measuring object can be obtained through an arithmetic operation with reference to the five interference patterns as follows.

$$\phi(x, y) = \tan^{-1}\left(\sin\alpha \frac{2(I_2(x, y) - I_4(x, y))}{2I_3(x, y) - I_5(x, y) - I_1(x, y)}\right)$$

To obtain three-dimensional shape information of measuring object from the optical interference pattern, an accurate phase shift is required. In case of EPI system using an optical fiber type interferometer, the change in a refractive index of optical fiber is extreme due to an environmental temperature and a vibration. Thus, the change of interference output should be compensated to accurately obtain three-dimensional shape information.

Referring back to FIG. 1, a light output through the first lens 14 is irradiated into the measuring object 15. An optical signal reflected from the measuring object 15 is applied to the optical coupler 10. A reference optical signal output through the second lens 12 is also applied to the optical coupler 10. An image of speckled pattern in which the optical signal reflected from the measuring object 15 and the reference optical signal are interfered with each other is obtained by the CCD camera 7. The three-dimensional shape information of the measuring object can be obtained using the interference image obtained by the CCD camera 7. As described above, the 3, 4 and 5 frame algorithms are needed to obtain the three-dimensional shape information.

In FIG. 1, the light source 1 is embodied by a HeNe laser having high visibility.

An operation principle of the optical phase extraction system of FIG. 1 is as follows.

The light source 1 applied through an optical fiber (OF1) is coupled by an asymmetric coupler 3 of 90:10 to be applied to a first optical fiber (OF2) and a second optical fiber (OF3). About 90% of the light source 1 is applied to the first optical fiber (OF2) and about 10% of the light source 1 is applied to the second optical fiber (OF3). That is, a laser light branches off from the coupler 3 to be applied to the first and second optical fibers OF2 and OF3 at the rate of 9:1 respectively.

The first phase modulator 9 connected to the first optical fiber OF2 phase-modulates an optical signal of the first optical fiber OF2 according to a generating signal applied through an output line L9 of the function generator 4. The optical signal having a modulated optical path sequentially passes through the first partial reflection coating part 13 and the first lens 14 to enter the measuring object 15.

The optical coupler 10 receives an optical signal reflected from the measuring object 15 and the reference optical signal output through the second lens 12 to output an image of speckled pattern in which the two signals interfere with each other. The CCD camera 7 captures an interference image to provide it to the data processing part 6 through a signal line L30. The data processing part 6 restores three-dimensional shape information using the set frame algorithm. The data processing part 6 can effectively extract an optical phase by receiving four speckled pattern images to perform an arithmetic operation on the measuring object 15.

In a system having a Michelson interferometer like FIG. 1, a phase error occurs due to an external environmental change such as a temperature, humidity and vibration.

Figure 2:
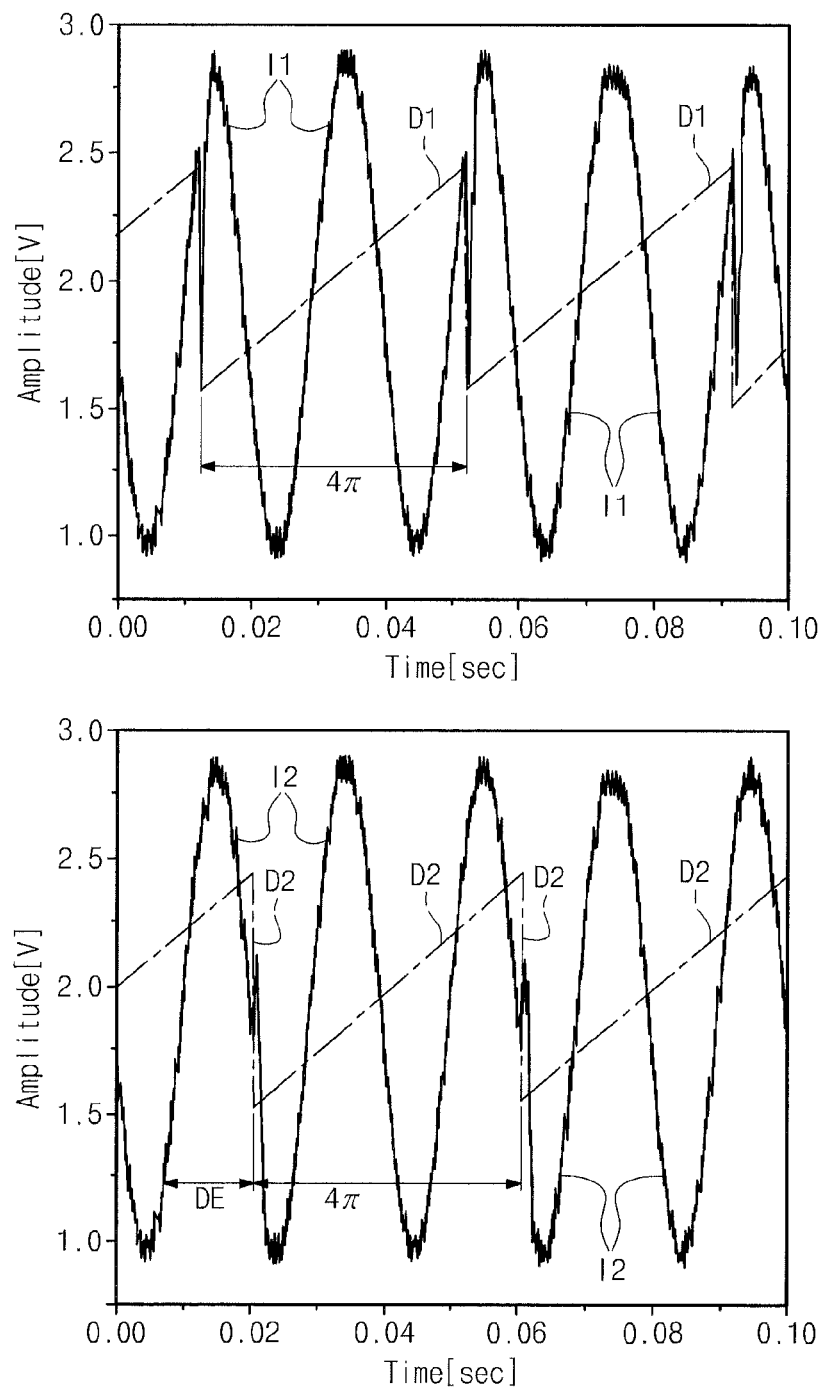
FIG. 2 is a drawing illustrating examples of phase error generated from the optical phase extraction system of FIG. 1.

FIG. 2 is a drawing illustrating examples of phase error generated from the optical phase extraction system of FIG. 1. In FIG. 2, a horizontal axis indicates a time and a vertical axis indicates amplitude. The time is given by sec unit and the amplitude is given by volt unit.

Reference numbers 11 and 12 indicate an output signal of photo diode and D1 and D2 are phase modulation control signals of the second phase modulator 8 applied through a signal line L20.

When comparing upper waveforms of FIG. 2 with lower waveforms of FIG. 2, the two output signals of the photo diode 2 have a phase difference due to an environmental disturbance. That is, the lower waveform is phase-shifted by a phase difference DE as compared with the upper waveform. The second phase modulator 8 installed in the optical interferometer can be driven by a phase modulation control signal such as a sawtooth wave (20 $V_{p-p}$) of 25 Hz. In this case, the second phase modulator 8 may be embodied by PZT(lead zirconate titanate).

If a phase of output signal obtained from the photo diode 2 rolls from side to side, it becomes difficult to accurately extract a three-dimensional image through the CCD camera 7. Thus, to accurately obtain a three-dimensional image, an accurate phase shift should be performed. To accurately perform a phase shift, a work correcting or compensating the phase change caused by an environmental disturbance becomes very important.

For that work, in some embodiments of the inventive concept, the second phase modulator 8 is additionally installed at an optical fiber interferometer to be controlled by the signal line L20. That is, when a phase error occurs due to an environmental disturbance of the optical fiber interferometer, the error is compensated by a phase compensation control method of closed loop type.

Reflection optical signals reflected from the first partial reflection coating part 13 of the first optical fiber OF2 and the second partial reflection coating part 11 are applied to the coupler 3. The reflection optical signals that are interfered with each other through the coupler 3 are provided to the photo diode 2 through a third optical fiber OF7.

An output signal output from the photo diode 2 is provided to the lock-in amplifier 5 through a signal line L3. A synchronous signal being output from the function generator 4 is provided to the lock-in amplifier 4 through a signal line L11 and is provided to the data processing part 6 through a signal line L12. The data processing part 6 receiving a lock-in amplification signal through the lock-in amplifier 5 monitors the lock-in amplification signal to check at the beginning whether or not a phase error caused by an environmental disturbance of optical fiber occur.

Thus, as illustrated in FIG. 2, when a phase error occurs, a phase modulation control signal is applied to the second phase modulator 8 through the signal line L20 to compensate the phase error using a phase compensation control method of closed loop type. Accordingly, a reflection optical signal reflected from the second partial reflection coating part 11 is phase-shifted by a phase error difference.

When a phase error is compensated or a phase error does not exist, an operation is performed which captures an image of object from the set number of relative phases to extract a three-dimensional image.

The first and second partial reflection coating parts 13 and 11 are prepared which perform a partial reflection of about 30% at the optical fibers QF4 and QF5 of both ends of interferometer to inversely reflect optical signals through the optical fibers. If reflection optical signals that are interfered with each other through the coupler 3 are provided to the photo diode 2 through the third optical fiber OF7, the photo diode 2 provides an output signal according to the strength of the interfered reflection optical signals to the signal line L13. The lock-in amplifier 5 amplifies the output signal on the basis of a synchronous signal applied through the signal line L11 to generate a lock-in amplification signal. The lock-in amplification signal is applied to the data processing part 6 through the signal line L15 to be used to detect a phase change due to an environmental disturbance.

The second phase modulator 8 has a closed loop control structure because it is needed not only to detect a phase change due to an environmental disturbance but also to perform a relative phase shift which a user wants.

If the data processing part 6 changes a control voltage through the signal line L20, a phase modulation value of the second phase modulator 8 is changed. Accordingly, the data processing part 6 can perform a monitoring of relative phase shift by receiving a lock-in amplification signal applied through the signal line L15.

Figure 3:
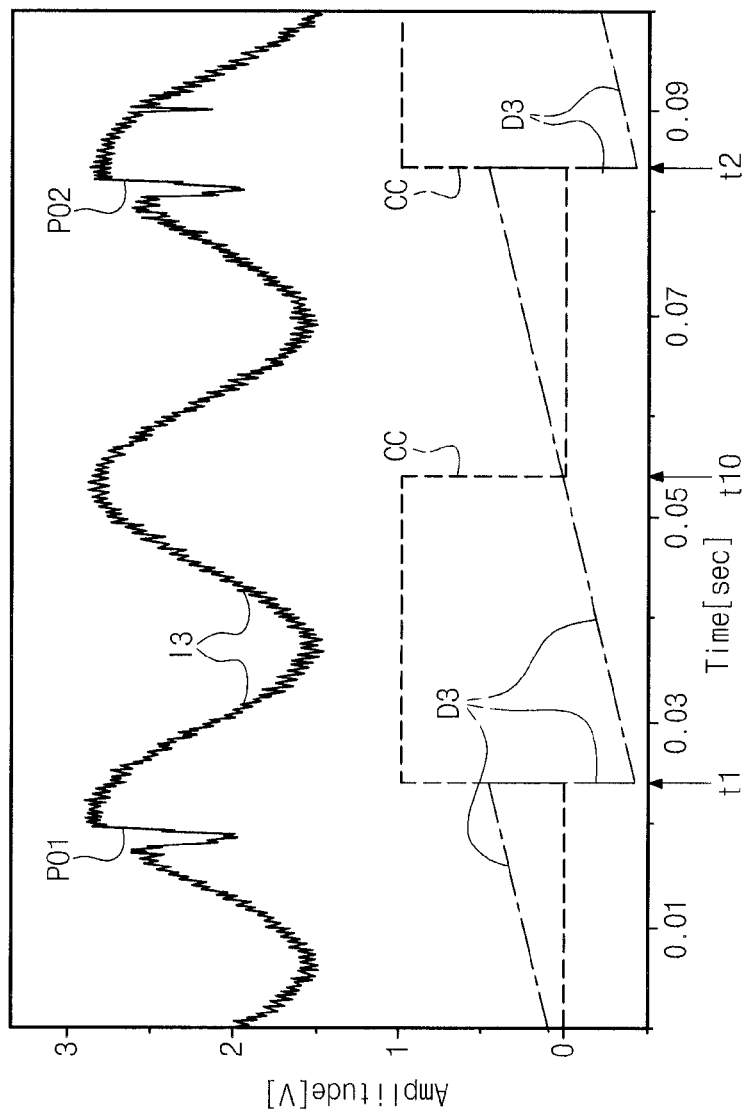
FIG. 3 is a drawing of signal waves suggested to illustrate a control example of phase compensation according to FIG. 1.

FIG. 3 is a drawing of signal waves suggested to illustrate a control example of phase compensation according to FIG. 1. In FIG. 3, a horizontal axis indicates a time and a vertical axis indicates amplitude. Herein, the time is given by sec unit and the amplitude is given by voltage unit.

A reference number I3 indicates an output signal of the photo diode 2 and D3 is a phase modulation control signal of the second phase modulator 8 applied through the signal line L20. A reference number CC is a synchronous signal output from the function generator 4 of FIG. 1.

FIG. 3 shows that a phase of the I3 signal is shifted by 180° after a time point t10 by controlling the second phase modulator 8. Since a reflected signal is monitored when a phase is shifted by 90°, in FIG. 3, a signal shifted by 180° which is double the shifted phase is represented. The synchronous signal CC may be used to obtain an image of the CCD camera 7. That is, if obtaining an image in keeping time of the synchronous signal CC, an interference image accurately phase-shifted can be obtained. When the synchronous signal CC is used as a shutter pressing signal, reliability of three-dimensional image obtained becomes high.

Figure 4:
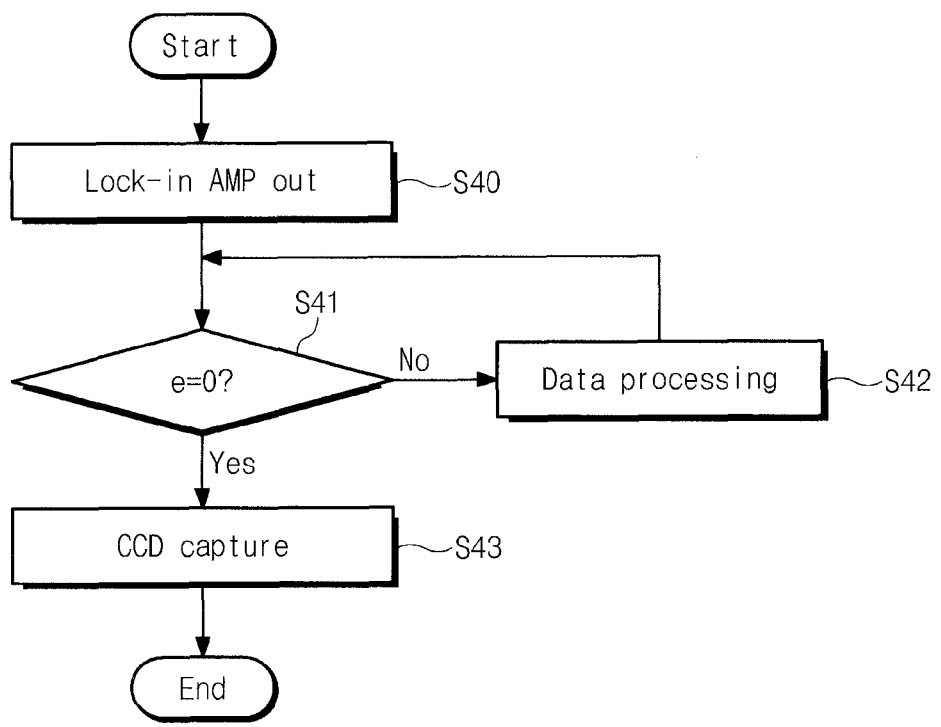
FIG. 4 is a flow chart of image extraction control of data processing part of FIG. 1.

FIG. 4 is a flow chart of image extraction control of data processing part of FIG. 1.

Referring to FIG. 4, in S40, the data processing part 6 receives a lock-in amplification signal from the lock-in amplifier 5. The data processing part 6 detects a phase change due to an environmental disturbance of optical fiber system by checking the lock-in amplification signal. In S41, whether or not a phase error occurs is checked. When a phase change exceeds a specific permissible error, it is judged that a phase error occurs. When a phase error occurs, the phase error is compensated through a data processing of S42.

When a phase error does not exist or is compensated, S43 is performed. In the S43, an image of object is captured from the set number of relative phases through the optical coupler. The captured image is used to extract a three-dimensional image.

Through a control flow like FIG. 4, a trigger for obtaining a CCD camera image is performed in a state that a phase error is compensated. When a phase error of interferometer occurs due to an environmental disturbance or a nonlinear error of phase modulator, the phase error is compensated. After the phase error is compensated, an interference image accurately shifted by the set phase value is obtained through the camera.

Figure 5:
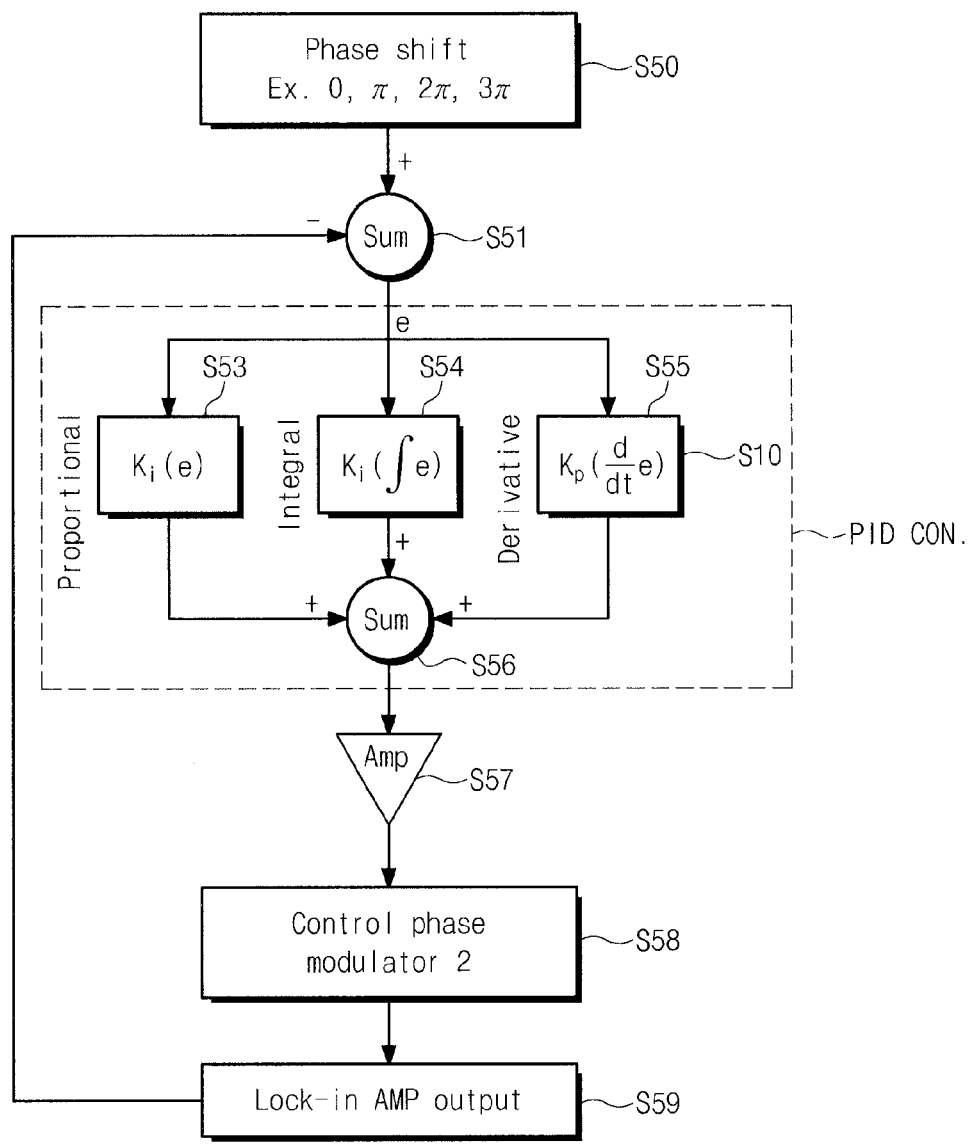
FIG. 5 is a flow chart of data processing of FIG. 4.

FIG. 5 is a flow chart of data processing of FIG. 4.

Referring to FIG. 5, in S50, a phase shift is performed by the set phase value. In S5, adding up is performed. S53, S54, S55 and S56 are needed to perform a PID (proportional integral derivative) control. The PID control may be performed by a separate PID controller and may be embodied by a PID control program of microprocessor of the data processing part 6.

In S57, a result of the PID control is amplified to be received and when a phase shift is needed through the received signal, S58 is performed. In the S58, a phase shift is performed by controlling the second phase modulator. In S59, a lock-in amplification signal is received again and a process goes back to the S51 to perform a monitoring.

An environmental disturbance of optical fiber interferometer is compensated and an output value of the lock-in amplifier is monitored to perform an accurate phase shift.

In some embodiments of the inventive concept, vulnerability of environmental disturbance is solved by using an interference signal occurring in the inside of interferometer. An accurate phase shift is required to extract three-dimensional phase information from the interference image obtained by the CCD camera. In some embodiments of the inventive concept, a relative phase shift control according to various phase values becomes possible by forming a closed loop control structure. Thus, the inventive concept can be applied to not only an optical fiber type ESPI but also various measuring systems using an optical fiber type interferometer.

According to some embodiments of the inventive concept, a phase error occurring in an optical fiber type interferometer due to an environmental disturbance is minimized or compensated.

Since an interference image accurately shifted by the set phase value can be obtained through a camera, reliability of three-dimensional phase information being extracted can be improved.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein

What is claimed is:

1. An image extraction method of optical phase extraction system comprising:

irradiating a first optical path and a second optical path with light from a light source;

modulating the light from the light source along the first optical path and the second optical path;

directing a first modulated optical output signal along the first optical path into a measuring object and direct a reflected signal of the first modulated optical output signal to a coupler;

directing a second modulated optical output signal along the second optical path as a reference signal to the coupler;

obtaining an image of the object from an interference signal of the reflected signal and the reference signal from the coupler using an imaging device;

checking whether a phase error due to an environmental disturbance of optical fiber occurs when a phase change exceeds a selected permissible error by monitoring an output signal obtained by interfering reflection optical signals reflected through the first optical path and the second optical path;

compensating an error using a phase compensation control method of closed loop type through one of the first optical path and the second optical path when a phase error occurs; and extracting an image by capturing an image of the object in a state that the image of the object is shifted by the set phase value when a phase error is compensated.

2. The image extraction method of claim 1, wherein the reflection optical signals are interfered with each other through a coupler.

3. The image extraction method of claim 2, wherein the output signal is generated through a photo diode receiving an output of the coupler to generate an electrical signal.

4. The image extraction method of claim 1, wherein the two paths are connected to a phase modulator performing a phase modulation, respectively.

5. The image extraction method of claim 1, wherein the error compensation is performed by phase-shifting a reflection optical signal reflected from the one path by a phase error difference.

6. The image extraction method of claim 1, wherein the image capture is performed through a CCD camera.

7. An optical phase extraction system comprising:

an optical fiber interferometer comprising a first optical path part and a second optical path part which branches off from a light source through a first coupler;

a first modulator modulating light from the light source along the first optical path part and a second modulator modulating light from the light source along the second optical path part, wherein a first modulated optical output signal from the first modulator is directed to a measuring object, a reflected signal of the first modulated optical output is directed along the first optical path part to a second coupler, and a second modulated optical output signal from the second modulator is directed along the second optical path part as a reference signal to the second coupler; and a compensation processing extraction part forming a closed loop control structure with respect to the second optical path part for obtaining an image of the object from an interference signal of the reflected signal and the reference signal from the second coupler using an imaging device, checking whether a phase error due to an environmental disturbance of optical fiber occurs when a phase change exceeds a selected permissible error by monitoring an output signal obtained by interfering reflection optical signals reflected through the first optical path and the second optical path, compensating an error using a phase compensation control method of closed loop type through one of the first optical path and the second optical path when a phase error occurs, and extracting an image by capturing an image of the object in a state that the image of the object is shifted by the set phase value when a phase error is compensated.

8. The optical phase extraction system of claim 7, wherein the optical fiber interferometer is an optical fiber Michelson interferometer.

* * * * *